United States Patent [19]
Ridings et al.

[11] Patent Number: 5,090,654
[45] Date of Patent: Feb. 25, 1992

[54] CATHEDRAL CEILING ADAPTER

[75] Inventors: Ronald L. Ridings, Cleburne; Robert M. Fitzpatrick, Arlington, both of Tex.

[73] Assignee: Craftmade International, Inc., Grand Prairie, Tex.

[21] Appl. No.: 666,846

[22] Filed: Mar. 8, 1991

[51] Int. Cl.$^5$ .............................................. B42F 13/00
[52] U.S. Cl. ................................ 248/343; 248/288.3; 248/324; 403/76; 403/90
[58] Field of Search ............... 248/342, 343, 344, 324, 248/288.3, 288.5; 403/90, 76, 77, 114, 115, 116, 131

[56] References Cited

U.S. PATENT DOCUMENTS

| | | |
|---|---|---|
| 793,030 | 6/1905 | Forg ..................................... 248/324 |
| 2,882,005 | 4/1959 | Ramsing ............................... 248/343 |
| 3,022,034 | 2/1962 | Purdy .................................... 248/342 |
| 3,059,948 | 10/1962 | Thompson et al. .......... 248/288.5 X |
| 3,378,221 | 4/1968 | Wolar et al. ......................... 248/343 |
| 4,225,260 | 9/1980 | Gaines ................................. 403/114 |
| 4,697,777 | 10/1987 | Yang .................................... 248/343 |

*Primary Examiner*—Ramon O. Ramirez
*Attorney, Agent, or Firm*—Harold E. Meier

[57] ABSTRACT

Apparatus for mounting ceiling fans to cathedral ceilings with steep pitch angles connected between a ball-joint and the fan down rod. At the point where the apparatus interconnects with the ball-joint, the apparatus includes means for permitting the apparatus and ball-joint to pivot to a greater angle within the ceiling hanger, allowing a ceiling fan attached thereto to be vertically suspended from cathedral ceilings having steep pitch angles.

11 Claims, 3 Drawing Sheets

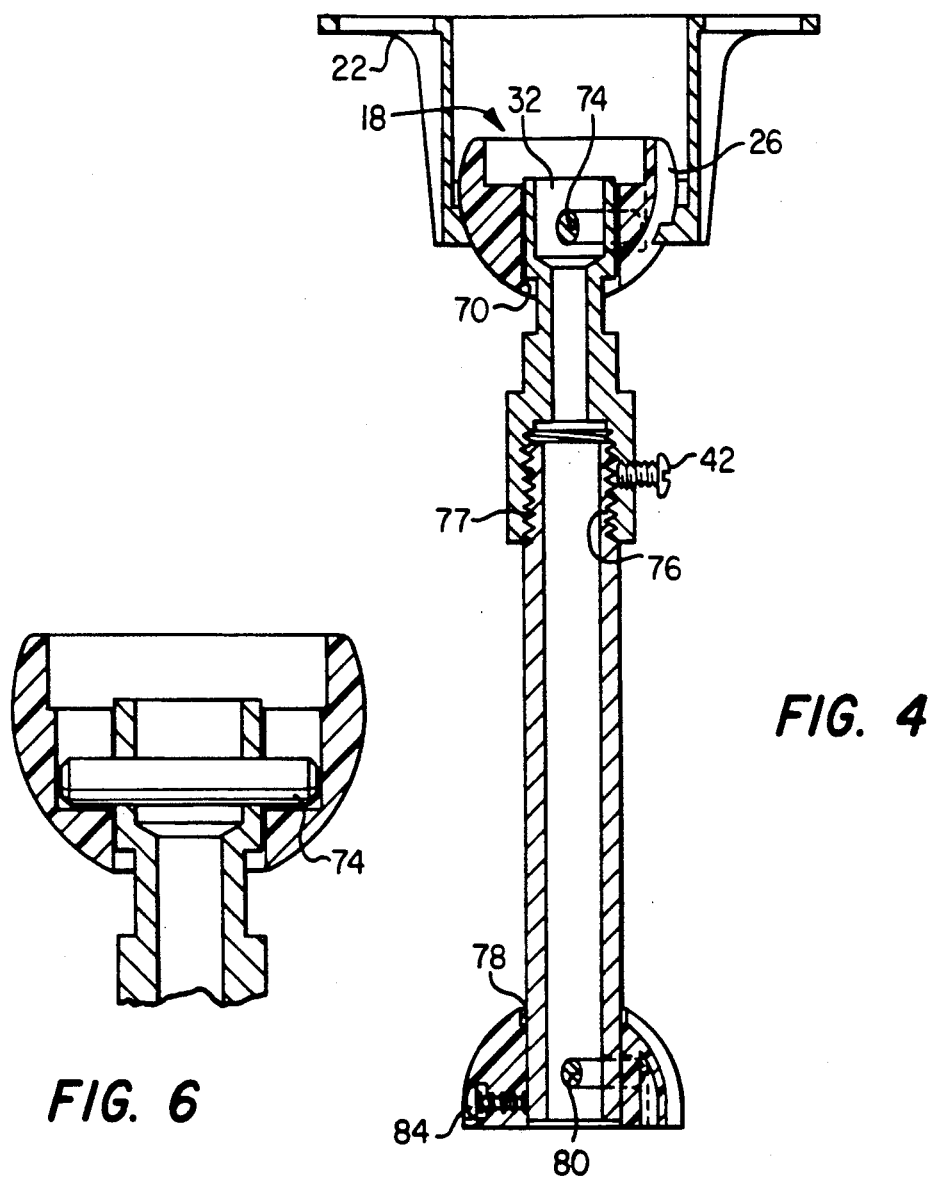
FIG. 4
FIG. 6
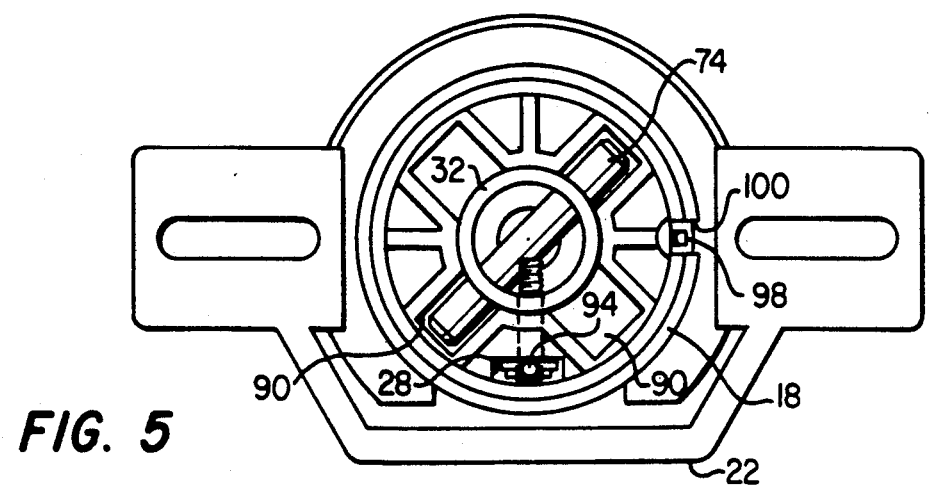
FIG. 5

CATHEDRAL CEILING ADAPTER

TECHNICAL FIELD OF THE INVENTION

This invention relates to an apparatus for mounting ceiling fans. In particular, the invention relates to an apparatus for mounting ceiling fans to cathedral ceilings.

BACKGROUND OF THE INVENTION

Historically, ceiling fans have been mounted by suspending the fan from a bracket attached to a beam in the ceiling. Later developments in mounting made use of a ball-joint ceiling hanger and down rod. This mounting scheme allowed the down rod and fan to pivot in the ceiling hanger giving consumers the ability to mount fans to ceilings which were not horizontal. Recently, more and more homes are being built with cathedral ceilings having pitch angles so steep that the standard ball-joint mount is incapable of allowing the fan to pivot to the angle needed to allow the fan to hang vertically.

SUMMARY OF THE INVENTION

In accordance with the present invention, there is provided a ceiling fan mounting apparatus that allows ceiling fans to be mounted to cathedral ceilings having pitch angles substantially greater than those compatible with the standard ball-joint mounting system.

According to the invention, the cathedral ceiling adapter is installed between a standard ball-joint and a fan down rod. In hanging a fan with a ball-joint mount, the maximum angle at which the fan may be vertically suspended is a function of the mounting bracket design and the mating relationship with the down rod. The narrower the diameter of the down rod, the more freedom of pivotal movement allowed within the mounting bracket and hence, the greater the pitch angle that may be achieved. The cathedral ceiling adapter of the present invention makes use of this relationship by providing a down rod configuration at the point where the ball-joint meets the mounting bracket to permit mounting to ceilings having greater pitch angles. The present invention allows the down rod to pivot to a greater degree within the mounting hanger and permits the fan to vertically hang when connected to cathedral ceilings with steep pitch angles.

BRIEF DESCRIPTION OF THE DRAWINGS

A more complete understanding of the present invention and the advantages thereof may be had by reference to the following Detailed Description with reference to the accompanying Drawings wherein:

FIG. 4 is a cross-sectional view of the ball-joint mounting system incorporating the present invention taken along the lines 4—4 of FIG. 2;

FIG. 5 is a top view of the ball-joint and hanger of FIG. 2; and

FIG. 6 is an enlarged cross-sectional partial view of the ball-joint illustrating the attachment of the cathedral ceiling adapter.

DETAILED DESCRIPTION OF THE INVENTION

Figure 1:
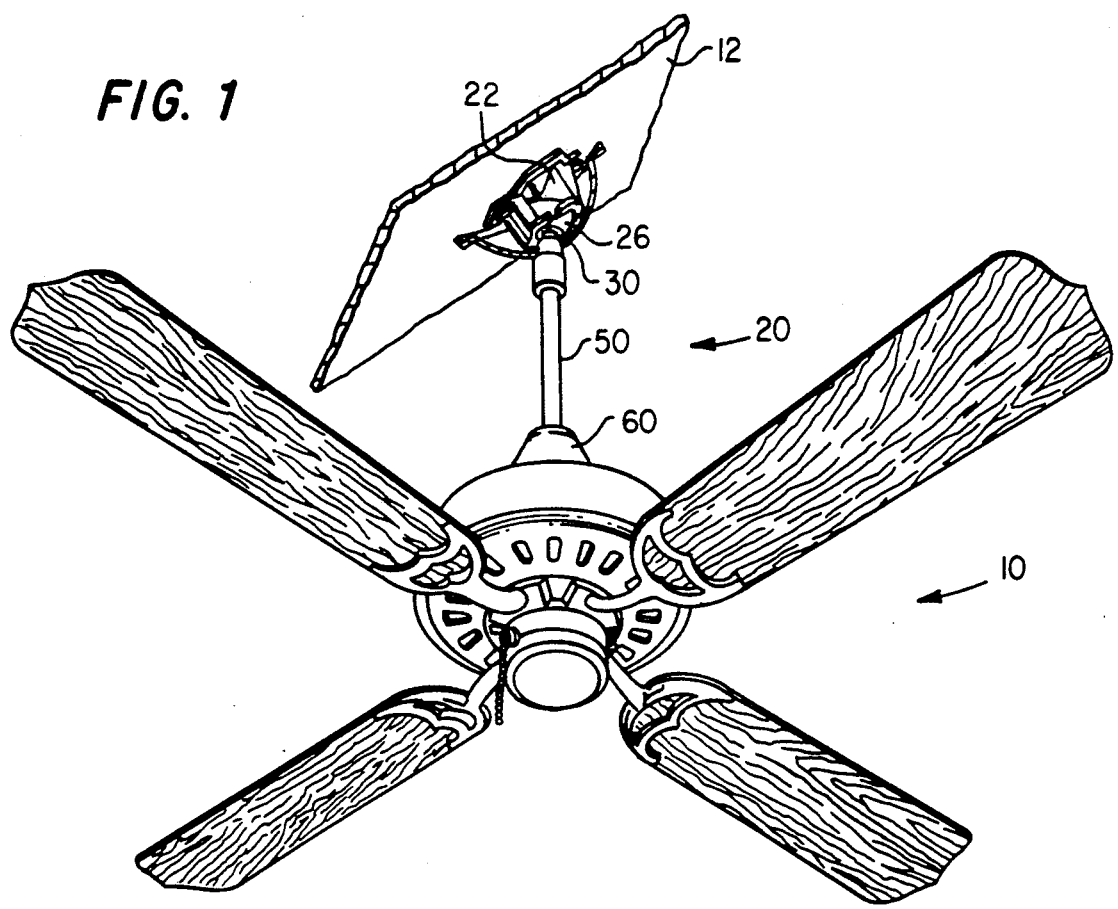
FIG. 1 is an illustration of a ceiling fan mounted to a cathedral ceiling incorporating the present invention.
Figure 3:
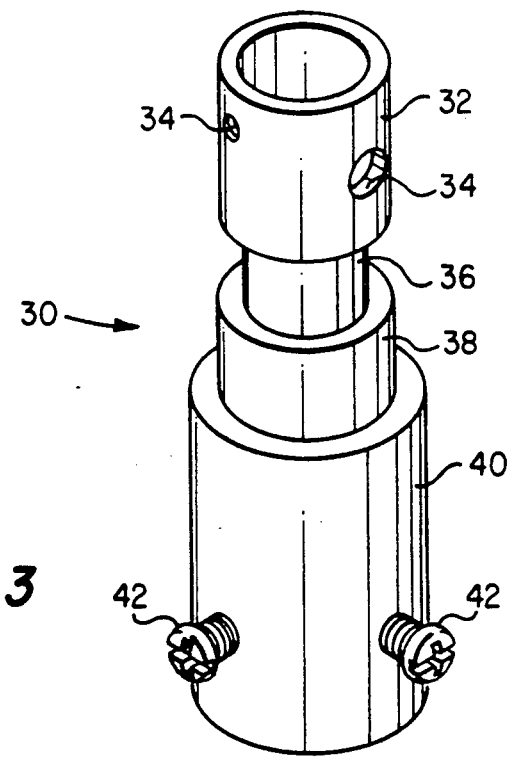
FIG. 3 is an enlarged perspective view of the cathedral ceiling adapter.
Figure 2:
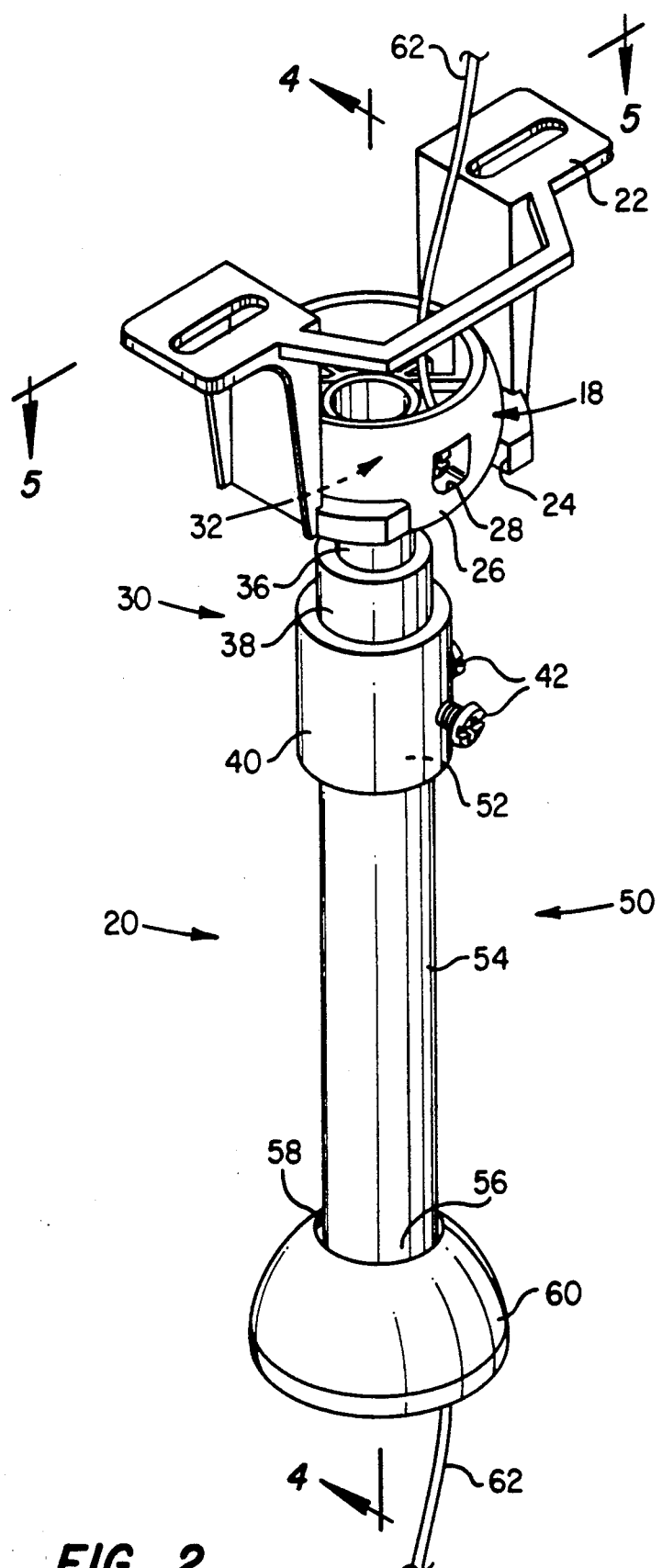
FIG. 2 is an enlarged perspective view of the ball-joint mounting system incorporating the present invention.

With reference to the drawings, FIGS. 1, 2 and 3 show a ceiling fan 10 mounted to a cathedral ceiling 12 by means of a mounting apparatus 20 containing a cathedral ceiling adapter 30 of the present invention. The mounting apparatus 20 consists of a hanger 22 with an upwardly disposed spherical surface 24. A ball-joint 18 with a downwardly disposed spherical surface 26 rests within and is supported by the upwardly disposed spherical surface 24 of the hanger 22. The adapter 30 is removably attached to and extends downwardly from the ball-joint 18. The upwardly disposed spherical surface 24 further includes openings in the apex and side thereof to enable the ball-joint 18 and the adapter 30 to be inserted for pivotal support therein.

A head portion 32 of the adapter 30 is inserted in the ball-joint 18. The head portion 32 of adapter 30 contains two circular openings 34 for the insertion of a pin or other conventional securing device to hold the head portion 32 in position in the ball-joint 18. The neck portion 36 of the adapter 30 is an integral extension of the head portion 32 and extends downwardly therefrom. The neck portion 36 has a substantially smaller diameter than either the head portion 32 or a standard down rod 50. This allows the adapter 30 and ball-joint 18 to pivot to a greater degree within the hanger 22. The shoulder portion 38 of the adapter 30 is an integral extension of the head portion 32 and neck portion 36 and extends downwardly from the neck portion 36. The diameter of the shoulder portion 38 is approximately the same as the diameter of the head portion 32. The body portion 40 is an integral extension of the head portion 32, neck portion 36 and shoulder portion 38 of the adapter 30 and extends downwardly from the shoulder portion 38. The body portion 40 contains screws 42 or other conventional fasteners for securing the adapter 30 to the down rod 50.

The down rod 50 is an integral unit having a first end 52 attached, through the use of screws 42, to and extending downwardly from the body portion 40 of the adapter 30. A body section 54 of the down rod 50 extends downwardly from the first end 52 to provide the required length for appropriate height positioning of the ceiling fan 10. A second end 56 of the down rod 50 extends downwardly from the body section 5 for attachment to the ceiling fan 10. The second end 56 of the down rod 50 is inserted into the circular opening 58 of an upwardly disposed spherical surface 60.

Referring to FIGS. 4, 5 and 6, the head portion 32 of the adapter 30 is inserted through a circular opening 70 at the apex of the ball-joint 18, and is secured therein by a metal pin 74 inserted through the circular openings 34 in the head portion 32 as shown in FIG. 3. The head portion 32 is further secured within the ball-joint 18 by use of a metal screw 94 to prevent further movement of the ball-joint 18 in a vertical direction. FIG. 4 also illustrates that the interior diameter 76 of the body portion 40 of the adapter 30 is threaded to matingly receive the threaded exterior diameter 77 of the first end 52 of the down rod 50.

The second end 56 of the down rod 50 is inserted through the circular opening 78 in the apex of the upwardly disposed spherical surface 60 and is secured therein by means of a metal pin 80 and screw 84 similar to that used to secure the head portion 32 of the adapter 30 to the ball-joint 18.

Referring now only to FIG. 5, the ball-joint 18 contains two perpendicularly intersecting compartments 90 for seating the securing metal pin 74. Screw 94 secures metal pin 74 within the compartments 90 and prevents vertical movement of ball-joint 18 with respect to the head portion 32 of adapter 30. A tab 98 is located on the upwardly disposed spherical surface 24 on the hanger 22. Tab 98 is matingly received into a groove 100 which runs downwardly along the spherical surface 26 of ball-joint 18. Tab 98 and groove 100 prevent the ball-joint 18 from rotating within the hanger 22.

Although preferred embodiments of the invention have been illustrated in the accompanying drawings and described in the foregoing detailed description, it will be understood that the invention is not limited to the embodiment disclosed but is capable of numerous rearrangements and modifications of parts and elements without departing from the spirit of the invention. It is the applicant's intention to cover by the claims all those changes and modifications which could be made to the embodiment of the invention herein disclosed without departing from the spirit and scope of the invention.

We claim:

1. Apparatus for mounting a ceiling fan on a cathedral ceiling having a steep pitch angle comprising:
   a hanger;
   a ball-joint pivotally supported by said hanger;
   an adapter attached to and extending downwardly from said ball-joint, said adapter including:
      a head portion attached to the ball-joint;
      a neck portion integral with and extending downwardly from said head portion;
      a shoulder portion integral with and extending downwardly from said neck portion; and
      a body portion integral with and extending downwardly from said shoulder portion; and
   an extension means attached to and extending downwardly from the body portion for proper height positioning of a ceiling fan attached thereto.

2. Apparatus as in claim 1 wherein said hanger comprises:
   an upwardly disposed spherical surface having openings in the apex and edge thereof to allow for insertion of the ball-joint and adapter for pivotal support by said hanger; and
   a tab located on and extending from said upwardly disposed spherical surface.

3. Apparatus as in claim 2, wherein in said ball-joint comprises:
   a downwardly disposed spherical surface having a circular opening located at the apex thereof to receive the head portion of said adapter; and
   a groove located on the downwardly disposed spherical surface, said groove extending downwardly across the downwardly disposed spherical surface toward the apex thereof.

4. Apparatus as in claim 3, wherein the groove matingly receives said tab to prevent rotation of said ball-joint means about the longitudinal axis of the adapter.

5. Apparatus as in claim 3, wherein said body portion of the adapter comprises:
   a hollow tubular section extending downwardly from the tubular shoulder portion having an exterior diameter substantially larger than that of the circular opening, and an interior diameter matingly threaded for receiving the threaded exterior diameter of the extension means; and
   attachment means for securing the connection between the body portion of the adapter and the extension means.

6. Apparatus as in claim 3 wherein said head portion of the adapter comprises:
   a hollow tubular section having an exterior diameter slightly smaller than the diameter of the circular opening located at the apex of the spherical surface of said ball-joint; and
   attachment means for attaching the ball-joint to the adapter.

7. Apparatus as in claim 3 wherein said neck portion of the adapter comprises a hollow tubular section extending downwardly from the tubular head section with an exterior diameter smaller than that of the diameter of said circular opening to allow for greater angular pivotal movement of the ball-joint within said hanger.

8. Apparatus as in claim 3, wherein said shoulder portion of the adapter comprises a hollow tubular section extending downwardly from the tubular neck section with an exterior diameter substantially equal to that of the circular opening.

9. Apparatus for connecting a ceiling fan down rod to a spherical ball-joint supported by a ball-joint hanger mounted to a steeply pitched cathedral ceiling comprising a hollow tubular adapter inserted in and secured to the spherical ball-joint wherein said hollow tubular adapter comprises:
   a first section having an exterior diameter slightly smaller than the interior diameter of a circular opening in the apex of said ball-joint and having means to secure the first section of said hollow tubular adapter to said ball-joint;
   a second section extending downwardly from said first section and having an exterior diameter significantly smaller than the exterior diameter of said first section for allowing increased angular pivotal movement of the ball-joint within the hanger;
   a third section extending downwardly from said second section and having a diameter substantially equal to that of said first section; and
   a fourth section with an interior diameter matingly threaded for receiving and securing the threaded exterior diameter of a standard ceiling fan down rod.

10. Adapter apparatus for connecting a ceiling fan down rod to a ceiling fan ball-joint inserted within and pivotally supported by a ball-joint hanger to mount a ceiling fan to a steeply pitched cathedral ceiling, comprising:
    a first section at one end of the adapter configured to be inserted in and secured to a ball-joint;
    a second section at an opposed end of the adapter configured to be mounted to a ceiling fan down rod of a given exterior diameter; and
    a third section integral with and between the first and second sections having an exterior diameter substantially smaller than the given exterior diameter of a ceiling fan down rod for allowing increased pivotal angular movement of a ball-joint within a ball-joint hanger.

11. The adapter apparatus as in claim 10 further comprising:
    mounting means for securing the first section to a ball-joint; and
    mounting means for securing the second section to a down rod.

* * * * *